United States Patent [19]

Best

[11] 4,456,373

[45] Jun. 26, 1984

[54] MEANS FOR DETERRING MISUSE OF COPYING MACHINES

[75] Inventor: Robert H. Best, Greensboro, N.C.

[73] Assignee: Burlington Industries, Inc., Greensboro, N.C.

[21] Appl. No.: 371,985

[22] Filed: Apr. 26, 1982

[51] Int. Cl.$^{3}$ .............................................. G03B 27/52

[52] U.S. Cl. ...................................... 355/133; 283/72; 354/105; 355/40; 355/75

[58] Field of Search .................... 355/40, 3 R, 127, 75, 355/114, 133; 283/8 B, 9 R; 354/105, 107, 109; 101/113

[56] References Cited

U.S. PATENT DOCUMENTS

| | | | |
|---|---|---|---|
| 214,541 | 4/1979 | Windrath | 101/113 |
| 1,506,361 | 8/1924 | Bulask | 355/127 |
| 3,612,684 | 10/1971 | Jones et al. | 355/40 |
| 3,623,413 | 2/1969 | Richards | 355/114 |
| 3,642,370 | 2/1972 | Meredith et al. | 355/75 |
| 3,775,007 | 11/1973 | Davidson | 355/404 |
| 3,802,724 | 4/1974 | Gosnell | 283/9 |
| 4,029,414 | 6/1977 | Rubenstein | 355/404 |
| 4,123,767 | 10/1978 | Halpern | 354/107 |
| 4,193,684 | 3/1980 | Armstrong | 355/40 |
| 4,251,152 | 2/1981 | Miyakawa et al. | 355/3 R |
| 4,265,469 | 5/1981 | Mowry, Jr. et al. | 283/8 B |

OTHER PUBLICATIONS

Article, Greensboro Daily News, Sep. 19, 1983.

*Primary Examiner*—Richard A. Wintercorn

*Attorney, Agent, or Firm*—Cushman, Darby & Cushman

[57] ABSTRACT

A device and method for deterring unauthorized use of xerographic copying machines of the type having a transparent platen on which a document having a primary image to be copied is registrable and which reproduces the primary image thereby creating a copy of the document, the device comprising a transparent substrate rigidly associated with the platen and bearing a secondary image thereon so that the primary and secondary images are concurrently reproducible on the document copy without affecting the visual perception of the primary image. The method comprises providing the platen with a secondary image, registering the document on the platen, and operating the copying machine so as to simultaneously reproduce the primary and secondary images.

21 Claims, 5 Drawing Figures

MEANS FOR DETERRING MISUSE OF COPYING MACHINES

BACKGROUND AND SUMMARY OF THE INVENTION

The present invention generally relates to a device and method for deterring misuse of copying machines, particularly xerographic copying machines of the type including a glass platen on which a document is placed and is thereby copied by the machine. Accordingly, in an embodiment of the present invention, a transparent member bearing a secondary image is preferably provided in juxtaposition with the glass platen so that when the document is placed on the glass platen, the primary and secondary images will be concurrently reproduced and appear on the document copy.

With the advent of xerography, and particularly the widespread use of xerographic copying machines, unauthorized personal use of such machines has become a major problem for businesses. For example, considerable costs are incurred by any business which utilizes xerographic copying machines due to employee misuse of the machines for personal reasons. The costs are not only associated with the actual material cost of operating the copying machines, such as, costs in the form of paper and electrical power, but such costs are also attributable to wasted employee time in utilizing the copy machines for personal use during regular business hours. Accordingly, the cost of copying machine misuse can be substantial over a period of time. Additionally, in view of the fact that most employee personal use of the xerographic copying machines occurs during regular business hours, that time is unproductive for the business and is therefore a detriment to the company's productivity.

Therefore, a practical and economically feasible system has been needed which deters misuse of copying machines. The logic behind the need for such a deterrent system is twofold. First, the actual material costs of operating the machines for personal employee use would be saved. Secondly, that portion of the employee's time which is devoted to personal use of the copy machine would be similarly saved thereby increasing that employee's productivity and benefitting the overall productivity of the company.

Prior systems for deterring copying machine misuse have tended to be extremely complex. For example, it has been proposed to interlock the copying machine with an electronic control unit so that the machine cannot be activated except by a special coded card issued to each authorized employee. When the employee inserts his card into the control unit, a discrete employee number is automatically encoded thereby activating the machine. The number of copies which that employee makes can therefore be recorded and the monthly summaries of copy machine use can be printed for each employee to identify potential misuse of the machine.

However, such an electronic system is expensive to purchase, maintain, and operate. Consequently, such a system does not lend itself to smaller businesses where the need to prevent misuse of copying machines is similarly apparent. Thus, for smaller businesses, this need must go unanswered due to the exorbitant cost of prior deterrent systems.

It has been proposed in the photographic art to provide an identification system for light-sensitive photographic film or the like so that a particular camera number, for example, can be transferred to the light-sensitive negative. See, U.S. Pat. Nos. 4,123,767 to Halpern; 4,193,684 to Armstrong; and 1,506,361 to Bulask. Document security systems to deter forgeries or alterations of an original document have also been proposed as exemplified by U.S. Pat. Nos. 3,802,724 to Gosnell and 4,265,469 to Mowry, Jr., et al. However, each of the above prior art proposals, of course, is not suitable for today's modern xerographic copying machines.

U.S. Pat. No. 4,251,152 proposes that two or more different latent electrostatic images can be formed on a dielectric or photoconductive material. According to this prior art, a first image that is to be repeated on a drum is placed together with a second independent charging corona system which continually provides a new address at a particular point on the first image and a separate means for removing only that address. Thus, the multi-image formation proposed by U.S. Pat. No. 4,251,152 is highly specialized and, once again, does not lend itself for use by small businesses. Additionally, this prior art proposal is not readily interchangeable among the extreme varieties of conventionally known xerographic equipment presently on the market.

However, according to the present invention, a device for deterring misuse or unauthorized use of a xerographic copying machine is provided which is inexpensive, easily produced, and can be readily tailored for use with virtually all known xerographic copying machines and thus, marks a distinct advance in the art.

Conventional copying machines utilize a rigid transparent glass platen on which a document having a primary image to be copied is registrable. The document is therefore placed with the primary image against the glass platen and the copying machine operated so that the particular copying means associated with the machine produces a copy of the document primary image.

According to the present invention, a transparent substrate is preferably provided for operative juxtaposition with the glass platen and includes a secondary image thereon. Thus, the transparent substrate according to the present invention can be placed on the glass platen so that when the primary image of the document is copied, the secondary image will also be concurrently copied. Suitable secondary images which can be utilized according to the present invention can include any indicia, company logo, trademark or other identifying marks, words or the like. Preferably, the secondary image is dense enough so that it is reproducible over a range of copy machine background settings yet is fine enough so that the primary image of the document being copied is readily and visibly perceptible.

Therefore, the present invention provides a novel device for efficiently and economically converting virtually all presently known xerographic copying machines so that unauthorized use thereof can be significantly deterred, if not completely alleviated.

Other aspects and advantages of the present invention will become more apparent from the detailed description of the preferred exemplary embodiments which follows.

BRIEF DESCRIPTION OF THE ACCOMPANYING DRAWINGS

Reference will be made to the accompanying drawings wherein.

DETAILED DESCRIPTION OF THE PREFERRED EXEMPLARY EMBODIMENT

Figure 5:
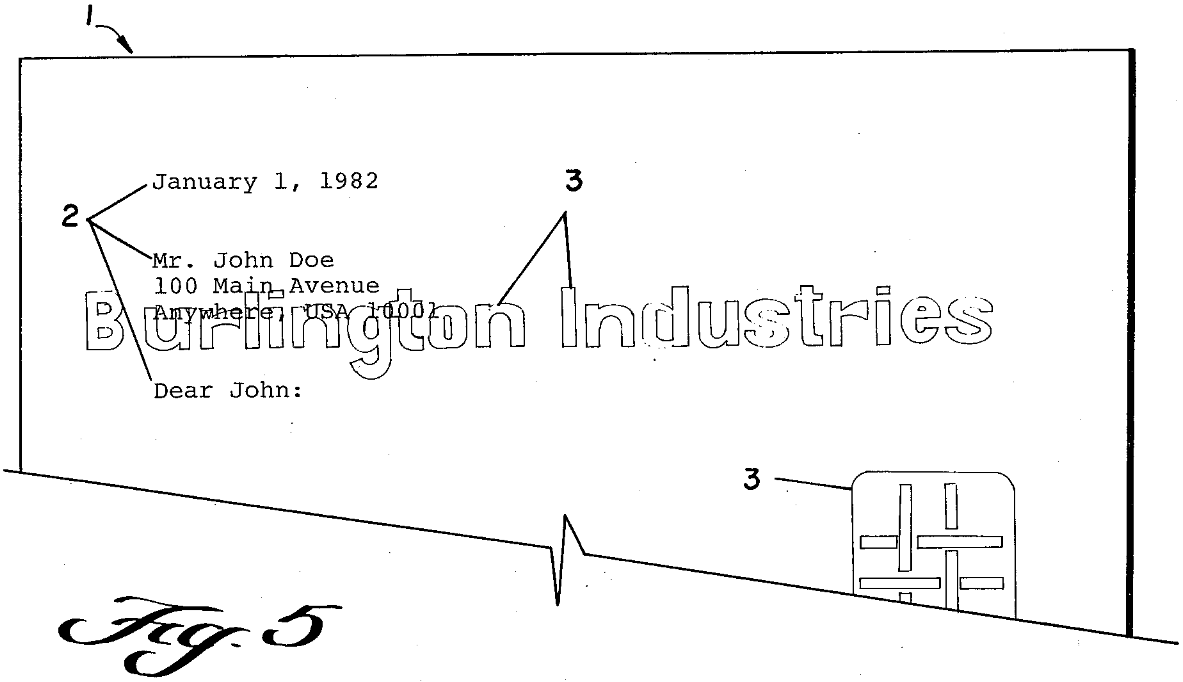
FIG. 5 is an illustrative sketch of a document copy reproduced by a conventional xerographic copying machine utilizing the deterrent device according to the present invention.

An illustrative example of a document copy 1 reproduced by a conventional xerographic copy machine utilizing the deterrent device according to the present invention is shown in FIG. 5. When utilizing the deterrent device according to the present invention, the conventional copy machine will concurrently reproduce the primary image 2 of the original document together with the secondary image 3 of the deterrent device. Accordingly, the reproduced secondary image 3 of the deterrent device according to the present invention is overlaid onto at least a portion of the reproduced primary image 2 of the document copy 1. However, the reproduced secondary image 3 is sufficiently light so as to not affect the visual perceptibility of the reproduced primary image 2 as will be explained in more detail below.

Figure 1:
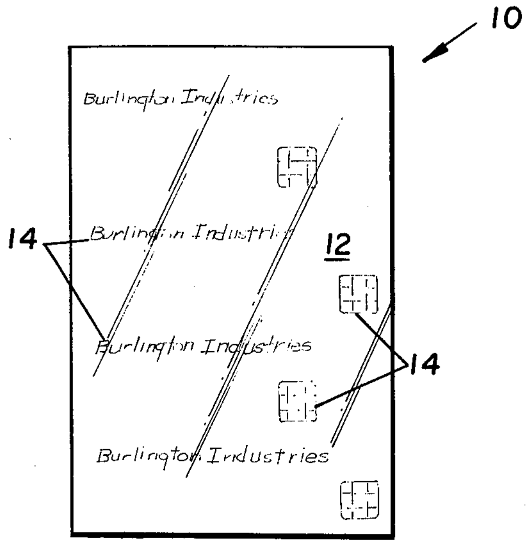
FIG. 1 is a general plan view of the deterrent device according to the present invention.
Figure 2:
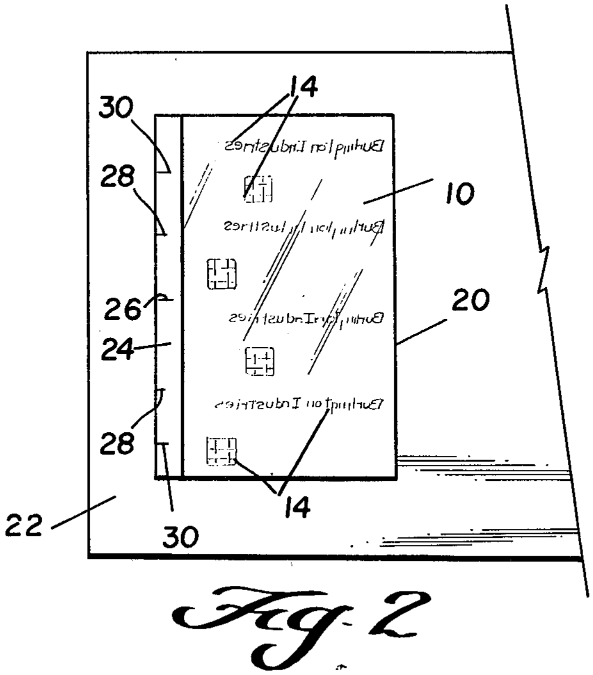
FIG. 2 depicts the deterrent device of FIG. 1 properly positioned on a conventional transparent platen of a xerographic copying machine.

FIG. 1 depicts a general plan view of a deterrent device 10 according to the present invention. In particular, the device 10 generally comprises a transparent substrate 12 having a secondary image 14 thereon. The secondary image 14 can be any predetermined indicia, marks, words, corporate symbols and/or logos in any combination as deemed desirable or necessary. For example, the secondary image 14 shown in FIGS. 1, 2 and 5 is the corporate name and logo of Burlington Industries, Inc. of Greensboro, N.C. The secondary image 14 may be as light or as heavy as desired. However, when consideration is given to the fact that secondary image 14 will be overlaid onto at least a portion of the primary image 14 of the original document to be copied, secondary image 14 should be sufficiently light so that the primary image is visually perceptible. Also, consideration must be given to the fact that many of the state-of-the-art copying machines have means for controlling the background tone intensities of the copied documents. Accordingly, the secondary image 14 of the deterrent device 10 according to the present invention should be heavy enough so as to be visible on the document copy over a range of background settings. Preferably, the secondary image 14 should be repeated a sufficient number of times so as to substantially cover the entire copy field.

For example, referring to FIG. 2, it is seen that the deterrent device 10 according to the present invention is placed upon the platen 20 of a conventional copying machine 22 so that the secondary image 14 substantially covers the entire copy field. Thus, if different paper sizes are to be copied (e.g., nominal $8\frac{1}{2}\times 11''$ paper or $8\frac{1}{2}\times 13''$ paper), such variations in paper sizes can be taken into account and will not adversely affect the efficient operation of the deterrent device 10 according to the present invention. Most conventional copying machines provide a registration guide 24 which marks the centerline 26 of the copy field and, additionally, provides for other indicating marks 28, 30 corresponding to standard nominal sizes of paper (e.g., $8\frac{1}{2}\times 11$ and $8\frac{1}{2}\times 13$).

The deterrent device 10 according to the present invention is, of course, placed in operative juxtaposition with the platen 22 of the copying machine 22 so that when viewed from above the secondary image 14 appearing thereon is reversed relative to normal viewing (e.g. mirror image thereof). This factor is necessitated by the operation of the xerographic copying machine 22. Thus, the document having the primary image to be copied is placed face down upon the platen and, in order for the secondary image 14 to be readable upon the primary image, the secondary image must therefore be reversed.

Figure 3:
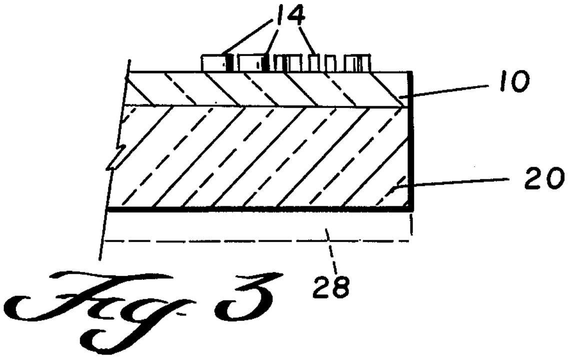
FIG. 3 is a cross-sectional sketch of one embodiment of the deterrent device according to the present invention.

FIG. 3 depicts in greater detail one preferred exemplary embodiment according to the present invention. The apparent cross-sectional dimensions of the FIG. 3 embodiment have been greatly exaggerated for clarity of presentation. The deterrent device 10 may comprise, for example, a thin transparent film material having secondary image 14 in the form of printed indicia or symbols thereon. For example, transpatent acetate film or like materials may be satisfactorily utilized according to the present invention. Additionally, a clear-drying adhesive may be applied to either a predetermined surface of platen 20 or one predetermined surface of the deterrent device 10 so that it can be securely bonded to the platen. The glass platen 20 shown in FIG. 3 is depicted as having a deterrent device 10 according to the present invention fixedly secured to the top surface 30 thereof. However, the deterrent device 10 according to the present invention, can be affixed to the bottom surface 32 of the platen 20 without adversely affecting the operation thereof as shown by dashed line at 28 in FIG. 3. Clear-drying adhesives suitable for affixing the deterrent device 10 to platen 20 are already in and of themselves well known in the adhesive art. Accordingly, with the deterrent device securely bonded to the platen, unauthorized removal thereof would, of course, be prevented.

Figure 4:
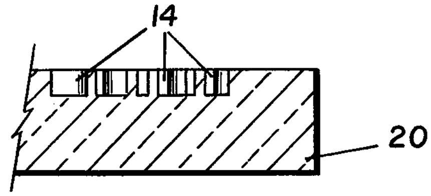
FIG. 4 is a cross-sectional sketch of another embodiment of the deterrent device according to the present invention.

FIG. 4 depicts another embodiment according to the present invention wherein the glass platen 20 is shown as having a secondary image in the form of indicia, symbols, words or the like etched directly into the surface thereof. Once again, the apparent cross-sectional dimensions of FIG. 4 have been greatly exaggerated for clarity. In practice, the secondary image 14 which is etched onto the platen 20 would merely be visible "scratches" which would be xerographically reproducible by the conventional copying machine. The etchings on the glass platen 20 can be enhanced to further define the secondary image 14 by providing a permanent ink or paint in the lowermost valley of the etching. Of course, a separate rigid transparent member having a secondary image etched thereon can be provided according to the present invention. Such a rigid transparent member can then be securely bonded or otherwise affixed to the glass platen without disrupting the overall operation of the copy machine.

In order to realize the advantages according to the present invention, the deterrent device as described above is placed in operative juxtaposition with the glass platen of a conventional xerographic copying machine.

Thereafter, an original document bearing a primary image is placed with the primary image side down upon the glass platen. The copying machine is then operated so as to reproduce any desired predetermined number of copies. As the copying machine operates, the secondary image and the primary image are simultaneously reproduced onto the document copies. Accordingly, the primary and secondary images are somewhat overlaid with respect to one another on the document copy (see FIG. 5).

The appearance of the secondary image on the document copy is expected to be sufficient to deter unauthorized use of copying machines. However, depending upon the indicia and/or words utilized as the secondary image, the device of the present invention, can also be used as a subtle advertising tool. For example, if a corporate logo and/or slogan is desired to be reproducible upon all corporate documents which are authorized, such an effect can be easily provided according to the present invention. Thus, all copies which are utilized for authorized purposes can be provided with faint "water mark" type impressions appearing on the copy field so as to promote the corporate logo, trademark or the like, and thereby, advertise the particular company.

While the present invention has been herein described in what is presently conceived to be the most preferred embodiments thereof, it is appreciated that those in the art may realize modifications and changes to the disclosed embodiments, which modifications and/or changes should be accorded the broadest interpretation of the appended claims so as to encompass all equivalent structures, assemblies and/or methods.

What is claimed is:

1. A device for deterring unauthorized use of xerographic copying machines of the type having a transparent platen on which a document having a primary image to be copied is registrable, and means for reproducing said primary image thereby creating a copy of said document, said device comprising transparent means rigidly associated with said platen and having a secondary image thereon, said transparent means for involuntarily and concurrently reproducing said primary and secondary images on each one of said document copies reproduced by said xerographic copying machine.

2. A device for deterring unauthorized use of xerographic copying machines of the type including a transparent platen having a bottom surface and a top surface on which a document having a primary image to be copied is registrable, and means for reproducing said primary image thereby creating a copy of said document, said device comprising transparent substrate means in fixed operative juxtaposition with said platen between said copy means and said document when said document is registered with said platent, said transparent substrate means including a secondary image reproducible by said copying machine for concurrently reproducing said primary and secondary images on said document copy, said secondary image being involuntarily overlaid with at least a portion of said primary image without affecting the visual perception of said primary image on said portion for each said document copy whereby unauthorized use of xerographic copying machines having said device operatively fixed thereto is prevented by virtue of the involuntary overlay of said primary and secondary images.

3. A device as in claim 2 wherein said substrate means is flexible.

4. A device as in claim 2 wherein said substrate means is rigid.

5. A device as in claim 2, 3 or 4 further comprising securing means for affixing said substrate means to said platen.

6. A device as in claim 5 wherein said securing mean comprises a clear-drying adhesive.

7. A device as in claim 5 wherein said substrate is affixed to the top surface of said platen.

8. A device as in claim 5 wherein said substrate means is affixed to the bottom surface of said platen.

9. A method of deterring unauthorized use of a xerographic copying machine of the type having a transparent platen on which a document having a primary image to be copied is registrable, and means for reproducing said primary image thereby creating a copy of said document, said method comprising the steps of:

(a) providing the platen with a fixed secondary image;

(b) registering the document having the primary image on the platen; and (c) operating the copying machine to simultaneously and involuntarily reproduce the primary and secondary images.

10. A method as in claim 9 wherein step (a) is practiced by etching the secondary image onto the transparent platen.

11. A method as in claim 9 wherein step (a) is practiced by the steps of:

(i) selecting a transparent substrate having a secondary image thereon; and (ii) affixing the transparent substrate selected according to step (i) to the platen.

12. A method as in claim 11 wherein step (ii) is practiced by bonding the transparent substrate to the platen with a transparent adhesive.

13. A method as in claim 11 or 12 wherein the transparent substrate is affixed to the top surface of the platen.

14. A method as in claim 11 or 12 wherein the transparent substrate is affixed to the bottom surface of the platen.

15. A method as in claim 11 or 12 wherein the transparent substrate is flexible.

16. A method as in claim 11 or 12 wherein the transparent substrate is rigid.

17. In a xerographic copying machine of the type having a transparent platen having a surface on which a document having a primary image to be copied is registrable and means for reproducing said primary image thereby creating a copy of said document, the improvement comprising means for deterring unauthorized use of said xerographic copying machine, said unauthorized use deterring means including means defining etched areas on one surface of said platen to establish a secondary image wherein said unauthorized use deterring means involuntarily causes simultaneous reproduction of said primary and secondary images on said document copy.

18. In a xerographic copying machine of claim 17 wherein the improvement further comprises an opaque material at least partially contained in said etched areas to enhance the reproduction of said secondary image.

19. In a xerographic copying machine of claim 18 wherein said opaque material is permanent ink or paint.

20. A device as in claim 2 wherein said transparent substrate includes means defining etched areas on a surface of said platen to define said secondary image.

21. A device as in claim 13 wherein said etched areas include an opaque material to enhance reproduction of said secondary image.

* * * * *

UNITED STATES PATENT AND TRADEMARK OFFICE

CERTIFICATE OF CORRECTION

PATENT NO. : 4,456,373

DATED : June 26, 1984

INVENTOR(S) : BEST, Robert H.

It is certified that error appears in the above—identified patent and that said Letters Patent is hereby corrected as shown below:

Column 1, line 26, delete the comma between "such as" and "costs";

lines 43 and 57, change each occurrance of "copy" to --copying--.

Column 2, line 52, change "copy" to --copying--;

line 59, change "alleviated" to --eliminated--.

Column 3, lines 20 and 24, change each occurrance of "copy" to --copying--.

Column 4, line 27, change "transpatent" to --transparent--; and line 64, change "copy" to --copying--.

UNITED STATES PATENT AND TRADEMARK OFFICE

CERTIFICATE OF CORRECTION

PATENT NO. : 4,456,373

DATED : June 26, 1984

INVENTOR(S) : BEST, Robert H.

It is certified that error appears in the above—identified patent and that said Letters Patent is hereby corrected as shown below:

Column 5, line 15, delete the comma between "invention" and "can";

line 52, change "copy means" to --means for reproducing--;

line 53, change "platent" to --platen--.

Signed and Sealed this

*Twenty-second* Day of *January 1985*

[SEAL]

*Attest:*

DONALD J. QUIGG

*Attesting Officer* *Acting Commissioner of Patents and Trademarks*